L. & J. C. MERRILL.
Wire-Fences.

No. 155,538. Patented Sept. 29, 1874.

WITNESSES:
P. C. Dieterich
W. C. McArthur

INVENTOR
L. & J. C. Merrill
per J. H. Alexander
ATTORNEY.

UNITED STATES PATENT OFFICE.

LUTHER MERRILL AND JOHN C. MERRILL, OF TURKEY RIVER STATION, IOWA.

IMPROVEMENT IN WIRE FENCES.

Specification forming part of Letters Patent No. 155,538, dated September 29, 1874; application filed August 28, 1874.

*To all whom it may concern:*

Be it known that we, LUTHER MERRILL and JOHN C. MERRILL, of Turkey River Station, in the county of Clayton and State of Iowa, have invented certain new and useful Improvements in Fences; and we do hereby declare that the following is a full, clear, and exact description thereof, reference being had to the accompanying drawings, and to the letters of reference marked thereon, which form part of this specification.

The nature of our invention consists in a suspended swinging fence, as will be hereinafter more fully set forth.

In order to enable others skilled in the art to which our invention appertains to make and use the same, we will now proceed to describe the manner in which the same is or may be constructed, referring to the annexed drawing, in which—

Figure 1:
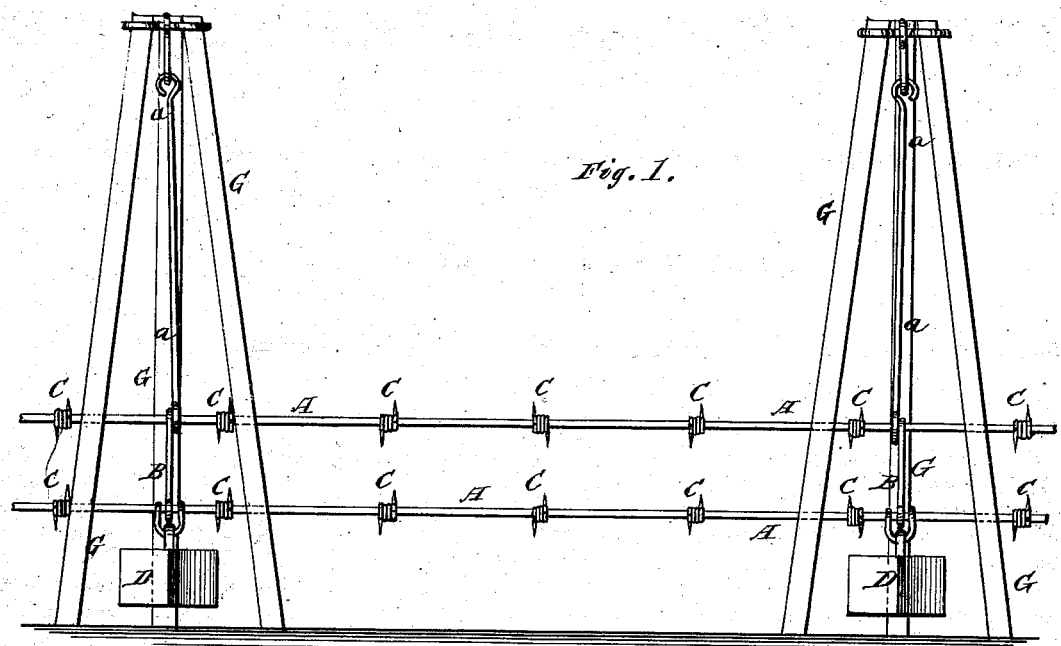
Figure 2:
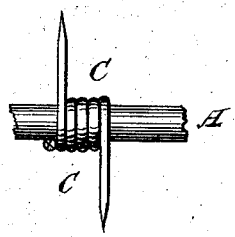
Figure 3:
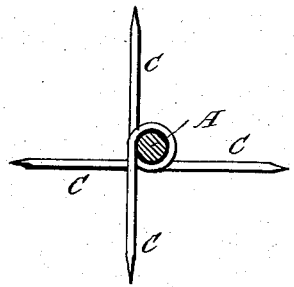

Figure 1 is a side elevation, and Figs. 2 and 3 are detail views of the brads C.

Our fence is composed of two or more parallel wires, A A, connected at suitable intervals with vertical cross-wires B B. At suitable intervals on the horizontal wires A A are attached sharp-pointed brads C C, made of wire or other suitable metal, and the points of which project in every direction. Weights D D are suspended from the bottom wire of the fence at any desired intervals. This fence may be suspended by means of rods or wires *a a* from tripods G G, arranged at any desired distances apart. These tripods may either rest on the ground, or be inserted therein, thus making the fence either portable or stationary, as desired.

When cattle or other stock rub against this fence ever so slightly, it will yield and come back again, when the brads C will prick the animal, and thus cause it to keep away from the fence.

A fence of this kind is cheaply made, and can easily be put up and taken down, as desired.

For convenience in handling, it should be made in sections of convenient length, and the sections may be united together by hooks or other suitable means.

Having thus fully described our invention, what we claim as new, and desire to secure by Letters Patent, is—

1. A swinging wire fence attached to depending rods *a a*, which are suspended from posts planted in or placed on the ground, substantially as herein set forth.

2. A swinging wire fence provided with sharp-pointed brads, and suspended by rods between posts planted in or placed on the ground, substantially as and for the purposes herein set forth.

3. A swinging wire fence suspended between posts, provided with sharp-pointed brads and a series of suspended weights, substantially as and for the purposes herein set forth.

In testimony that we claim the foregoing as our own we affix our signatures in presence of two witnesses.

LUTHER MERRILL.

JOHN C. MERRILL.

Witnesses:
WM. WOODWORTH,
J. W. SIMMONS.